United States Patent [19]

Ueda et al.

[11] Patent Number: 4,989,553
[45] Date of Patent: Feb. 5, 1991

[54] AIR INTAKE DEVICE OF ENGINE

[75] Inventors: Kazuhiko Ueda, Higashi-Hiroshima; Toshimitsu Tanaka, Kuga; Hiroyuki Oda, Hiroshima; Toshihiko Hattori, Hiroshima; Mikihito Fujii, Hiroshima, all of Japan

[73] Assignee: Mazda Motor Corporation, Hiroshima, Japan

[21] Appl. No.: 429,366

[22] Filed: Oct. 31, 1989

[30] Foreign Application Priority Data

Oct. 31, 1988 [JP] Japan ................................ 63-275889

[51] Int. Cl.[5] ............................................. F02B 75/18
[52] U.S. Cl. ............................................... 123/52 MV
[58] Field of Search ......... 123/52 M, 52 MV, 52 MB, 123/52 MC, 52 ML, 306

[56] References Cited

U.S. PATENT DOCUMENTS

| | | | |
|---|---|---|---|
| 4,708,097 | 11/1987 | Hatamura et al. | 123/52 M |
| 4,738,229 | 4/1988 | Wada et al. | 123/52 MB |
| 4,829,941 | 5/1989 | Hitomi et al. | 123/52 ML |
| 4,846,117 | 7/1989 | Hitomi et al. | 123/52 MV |
| 4,858,570 | 8/1989 | Matsumoto et al. | 123/52 ML |

FOREIGN PATENT DOCUMENTS

61-173730 10/1986 Japan .

Primary Examiner—David A. Okonsky
Attorney, Agent, or Firm—Wenderoth, Lind & Ponack

[57] ABSTRACT

An air intake device of an engine has intake pipes connected to each of the engine cylinders divided into first and second groups to prevent the continuance of the intake strokes of adjacent cylinders. A first connecting cavity connected to the first group of cylinders and a second connecting cavity connected to the second group of cylinders are arranged in parallel with each other, for effecting supercharging by utilizing the dynamic effect of intake air into each cylinder. A first communicating passage is connected at one end to a longitudinal end of the first connecting cavity and at the other end to a longitudinal end of the second connecting cavity. A second communicating passage arranged on the same side as the first communicating passage is connected at one end to a side of the first connecting cavity and at the other end to a side of the second collecting cavity. The effective passage length of the first communicating passage is shorter than that of the second communicating passage.

44 Claims, 5 Drawing Sheets

AIR INTAKE DEVICE OF ENGINE

BACKGROUND OF THE INVENTION

1. Field of the Invention

The present invention relates to an air intake device of a multi-cylinder engine and, more particularly, to an air intake device of an engine adapted to be supercharged by utilizing the dynamic effect of intake air obtained by the suction of air in each cylinder.

2. Description of the Prior Art

In the conventional multi-cylinder engine, an air intake device utilizing the dynamic effect of intake air for supercharging is known. Generally two types of supercharging are known: inertia supercharging and resonance supercharging (refer to U.S. Pat. Nos. 4,708,097 and 4,829,941). According to inertia supercharging, a negative pressure wave from a cylinder on an intake stroke is changed into a positive pressure wave by means of a pressure changing section represented by a surge tank, by which the intake air is forced into the cylinders for supercharging. In the meantime, in resonance supercharging, a plurality of cylinders are divided into two groups in order to prevent the continuance of the intake stroke in adjacent cylinders, and intake pipes from each group of cylinders are connected to respective intake manifold sections that are interconnected. According to this intake system, the intake air in the intake pipe is vibrated by utilizing pressure waves produced by the periodic opening and closing of the intake port, to accomplish supercharging to each cylinder by the vibratory pressure of this intake air.

In supercharging utilizing such a dynamic effect of intake air, increasing the length of a portion of the intake pipe taking part in supercharging can decrease the engine speed at which supercharging can be effected with the highest efficiency. Reversely, decreasing the length of the portion of the intake pipe can increase the engine speed at which supercharging can be performed with the highest efficiency. Therefore, to efficiently supercharge the engine within the range of both high and low engine speeds, all that has to be done is to change the length of the portion of the intake pipe that takes part in supercharging in accordance with the engine speed, or to use another portion of the intake pipe of different length according to the engine speed.

For example, there has been disclosed in Laid-Open Japanese Utility Model Application No. 61-173730 a construction that the effective pipe length of the portion of intake pipe used in supercharging can be changed according to the engine speed. That is, two intake manifold sections to which intake pipes of two groups of cylinders are connected are provided with communicating passages interconnected at each end, and the length of these communicating passages are changeable in accordance with the engine speed.

Here, it is conceivable that the arrangement of two long and short communication passages employed in place of the above-mentioned communicating passages changeable in pipe length and connected between two intake manifold sections, the long passage being used at relatively low engine speeds, and the short passage being used at high engine speeds. In this case, however, such communicating passages must be arranged properly, otherwise the intake system becomes large in size. Heretofore, however, no attention has been paid, from the point of view of realizing a compact device, to how a plurality of communicating passages should be arranged, and no material example has been suggested of such arrangement.

SUMMARY OF THE INVENTION

In view of the above-described drawbacks inherent in the conventional known techniques, it is an object of the present invention to provide an air intake device of an engine wherein two communicating passages interconnecting two connecting intake pipes, to which intake pipes from each cylinder are connected, are compactly arranged.

The engine air intake device of the present invention has intake pipes connected to each of the engine cylinders divided into first and second groups to prevent the continuance of the intake strokes of adjacent cylinders, a first means for connecting intake pipes which are of the first group of cylinders and a second means for connecting intake pipes which are of the second group of cylinders, such first and second connecting means being arranged in parallel with each other. Supercharging is effected by utilizing the dynamic effect of intake air into each cylinder. A first communicating passage is connected at one end to the longitudinal end of the first connecting means and at the other end to the same longitudinal end of the second connecting means. A second communicating passage is disposed on the same end as the first communicating passage, relative to the first and the second connecting means, and is connected at one end to a side of the first connecting means and at the other end to a side of the second connecting means. The effective passage length of the first communicating passage is shorter than that of the second communicating passage.

According to this construction, when both communicating passages are arranged substantially in the longitudinal direction of the intake pipe connecting means, the second communicating passage of greater length is connected to sides of the intake pipe connecting means, not at the longitudinal ends thereof. Therefore, the amount of projection of the communicating passages in the longitudinal direction from the end of the intake pipe connecting means can be decreased by moving the position of connection thereto in the longitudinal direction. Accordingly, it is possible to decrease the length of the two long and short communicating passages in the longitudinal direction.

The engine, e.g., is a V-6 engine with the cylinders arranged in right and left banks of three cylinders each, and positioned relative to each other in the form of a V.

Each intake pipe is connected to a lower side surface of respective of the first and second intake pipe connecting means.

The first and second intake pipe connecting means are situated in the central space formed by the two banks with each intake pipe extending to the central space between the two banks and connected to the first or second intake pipe connecting means. The first and second connecting means are connected to an upstream intake system disposed upstream thereof. The upstream intake system comprises upstream intake branch pipes with their downstream ends connected to upper side surfaces of the first and second intake pipe connecting means and joined at their upstream ends to each other at a junction, and an upstream intake main pipe connected at a downstream end thereof to the junction and at an upstream end thereof to the atmosphere, and having a throttle valve therein. The first and second intake pipe connecting means are integrally formed and connected to independent downstream intake systems provided downstream thereof by each cylinder. These independent downstream intake systems consist of intake pipes and intake ports connecting the intake pipes to the cylinders. The length of the independent downstream intake systems is short so that inertia supercharging does not occur within a practical range of engine speeds. The first and second intake pipe connecting means have at longitudinal ends thereof first and second opening and closing means for opening and closing the intake pipe connecting means independently for communication with the first and second communicating passages.

The first and second communicating passages are connected to the first and second intake pipe connecting means and are defined within first and second communicating pipes capable of interconnecting the intake pipe connecting means. The first and second communicating pipes have therein the first and second opening and closing means which open and close the first and second communicating pipes, respectively. The first communicating passage connected to the longitudinal ends of the first and second intake pipe connecting means has lower communicating pipe sections arranged adjacent to one another, formed smaller in diameter than the first and second intake pipe connecting means, having lower surfaces formed flush with the lower surfaces of the first and second intake pipe connecting means, and having upper surfaces lower than the upper surfaces of the first and second intake pipe connecting means. Opposite of the first communicating passage are connected to the first and second intake pipe connecting means through the lower communicating pipe sections. The second communicating passage connected to sides of the first and second intake pipe connecting means has upper communicating pipe sections arranged adjacent to each other, on the upper side of the lower communicating pipe sections and extending over upper sides of the first and second intake pipe connecting means. These upper communicating pipe sections are smaller in diameter than the lower communicating pipe sections, and the second communicating passage is connected at opposite ends thereof to the upper sides of the first and second intake pipe connecting means by the upper communication pipe sections. The lower and upper communicating pipe sections are formed in one body. Furthermore, the lower and upper communicating pipe sections are formed integral with the first and second intake pipe connecting means. The first and second communicating passages have the same inside diameters as the lower and upper communicating pipe sections, respectively. The first and second communicating passages are U-shaped paths, and have, in such paths, the first and second opening and closing means which open and close the first and second communicating passages to connect the first and second intake pipe connecting means with each other. The first and second opening and closing means are provided at opposite ends of the first and second communicating passages. When the engine is running in a low speed range, both the first and second opening and closing means maintain the first and second communicating passages closed. In the medium-speed range of engine operation, the second opening and closing means maintains the second communicating passage open, while the first opening and closing means maintains the first communicating passage closed. Furthermore, in the high-speed range of engine operation, both the first and second opening and closing means maintain both the first and second communicating passages open. The second communicating passage connected to the sides of the first and second intake pipe connecting means has extending along sides thereof side connecting pipe sections, with opposite ends of the second communicating passage communicating with the sides of the first and second intake pipe connecting means through such side connecting pipe sections. The second communicating passage has lower communicating pipe sections extending to the lower sides of the first and second intake pipe connecting means, both ends of the second communicating passage being connected to the lower surface of the first and second intake pipe connecting means through these lower communicating pipe sections.

The present invention provides an air intake device for a V-6 engine with the cylinders arranged in right and left banks of three cylinders each, arranged in a V shape relative to each other. The air intake device includes intake pipes connected to the cylinders divided into the first and second banks of cylinders to prevent the continuance of intake strokes in adjacent cylinders. The first means connects intake pipes of the first group of cylinders, and the second means connects intake pipes of the second group of cylinders are arranged parallel with each other and are adapted to supercharge each cylinder by utilizing the dynamic effect of intake air into the cylinders. The first and second connecting means are formed in one body and are disposed in the central space between the two banks formed the V shape. Intake pipes extend to the central space and are connected to each of the first and second connecting means. A first communicating passage with a U-shaped path has lower communicating pipe sections which are formed integral with the first and second connecting means, are adjacent to each other, with lower surfaces thereof being flush with lower surfaces of the first and second connecting means, with upper surfaces thereof being lower than upper surfaces of the first and second connecting means, and are smaller in diameter than the first and second connecting means. Such lower communicating pipe sections are connected at one end to the longitudinal end of the first connecting means and at the other end to the longitudinal end of the second connecting means, at the same longitudinal end thereof. A second communicating passage with a U-shaped path is formed integral with the first communicating passage, is arranged on the same side as the first communicating passage relative to the first and second connecting means, and has upper communicating pipe sections arranged adjacent to each other and at upper sides of the lower communicating pipe sections, thus being integrally formed with the lower communicating pipe sections and the first and second connecting means. The upper communicating pipe sections are smaller in diameter than the lower communicating pipe sections. The second communicating passage is connected at one end to the upper surface section of the first connecting means and at the other end to the upper surface section of the second connecting means through the upper communicating pipe sections. The first and second opening and closing means are provided in he first and second communicating passages to open and close the first and second communicating passages independently to communicate with the first and second connecting means. The effective passage length of the first communicating passage is shorter than that of the second communicating passage.

Furthermore, the engine intake device according to this invention includes first and second communicating passages generally formed substantially U-shaped, with the effective passage length of the first communicating passage being shorter than that of the second communicating passage and with the effective sectional area of the first communicating passage being larger than that of the second communicating passage. Furthermore, the second communicating passage is arranged to be positioned within the outer contour of the first communicating passage.

In the above-described construction, the passage length of the second communicating passage can be relatively increased by arranging the second communicating passage of relatively small effective sectional area along the outer contour of the first communicating passage of relatively large effective sectional area. Therefore, the two long and short communicating passages can be arranged without increasing the width of the means for connecting intake pies in a direction orthogonal to the longitudinal direction thereof.

The first and second means for connecting intake pipes are situated in the central space formed by the two banks, with each intake pipe extending to the central space between the two banks and connected to the respective first and second connecting means. The first and second connecting means are connected to an upstream intake system disposed upstream thereof. The upstream intake system comprises upstream intake branch pipes with their downstream ends connected to upper sides of the first and second connecting means and joined at their upstream ends to each other. An upstream intake main pipe is connected at the downstream end thereof to a junction of the upstream intake branch pipes and at an upstream end thereof to the atmosphere, and has a throttle valve inserted therein. The first and second connecting means are integrally formed and are connected to independent downstream intake systems provided downstream thereof by each cylinder. These independent downstream intake systems consist of intake pipes and intake ports connecting the intake pipes to the cylinders. The length of the independent downstream intake systems is short so that inertia supercharging is not achieved within a practical engine speed range. The first and second connecting means have the first and second opening and closing means at the longitudinal ends thereof for opening and closing the respective connecting means for communication with the first and second communicating passages.

The first communicating passage is disposed under the second communicating passage. The first and second communicating passages are defined in the first and second communicating pipes which are connected to the first and second connecting means to enable interconnection therebetween. The first communicating pipe is curved in the form of a U such that both turned end sections thereof contact each other, while the second communicating pipe is curved into the form of a U with both turned sections thereof spaced in the direction of the width of the first and second connecting means. The first and second communicating pipes are formed to the width of the first and second connecting means. Both the turned ends of the second communicating pipe are aligned with the external contour of the first communicating pipe, and also the central curved section of the second communicating pipe is curved with a larger curvature than the curvature of the central curved section of the first communicating pipe on the inner side of the external contour of the first communicating pipe. Both turned ends of the first and second communicating pipes are connected to longitudinal ends of the first and second connecting means in a crosswise direction. The first and second communicating pipes are formed in one body. The first and second communicating pipes have inwardly thereof the first and second opening and closing means for opening and closing the first and second communicating pipes, respectively, and thereby for opening and closing the first and second communicating passages, respectively, to communicate the first and second connecting means to such passages, respectively. The first and second opening and closing means are provided at both ends of each of the first and second communicating passages. In the low-speed range of engine operating, both the first and second opening and closing means keep the first and second communicating passages closed. When the engine is running in the medium-speed range, the second opening and closing means keep the second communicating passage open and the first opening and closing means keep the first communicating passage closed. In the high engine-speed range both the first and second opening and closing means hold both the first and second communicating passages open.

BRIEF DESCRIPTION OF THE DRAWINGS

Hereinafter exemplary embodiments of an air intake device of an engine according to the present invention will be described with reference to the accompanying drawings, wherein.

DESCRIPTION OF THE PREFERRED EMBODIMENT

Figure 1:
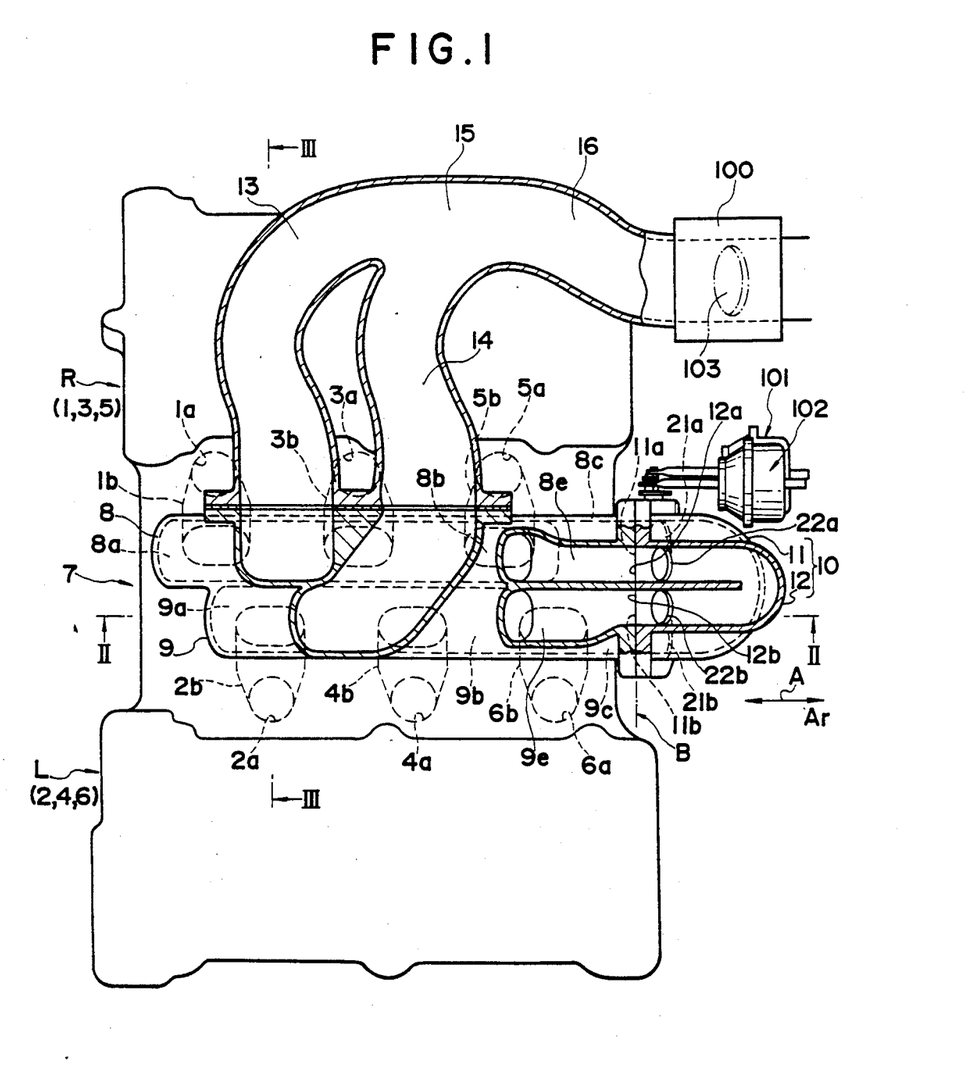
FIG. 1 is a partial sectional top view showing a major portion of an air intake device of an engine in one embodiment of the present invention.
Figure 2:
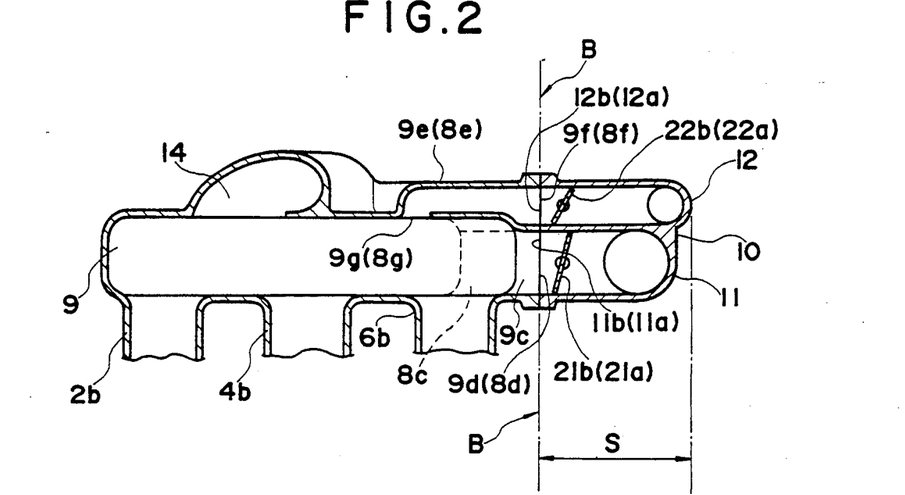
FIG. 2 is a sectional view taken along line II—II in FIG. 1.
Figure 3:
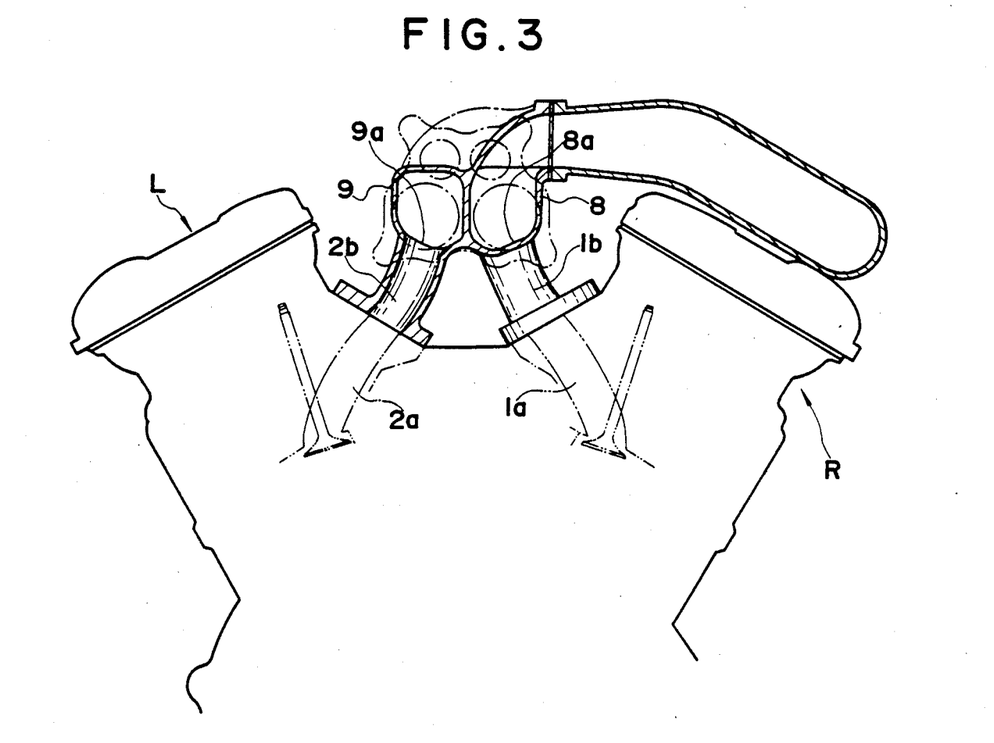
FIG. 3 is a sectional view taken along line III—III in FIG. 1.

FIGS. 1 to 3 are views showing the first embodiment of the present invention. As illustrated, this embodiment relates to an air intake device of a V-6 engine. The first, third and fifth cylinders 1, 3 and 5 and the second, fourth and sixth cylinders 2, 4 and 6 included in the right and left banks R and L arranged in a V-shape are separately disposed such that an intake stroke will not continue between adjacent cylinders. The cylinders fire in the firing order of 1 6 3 4 5 2. Intake branch pipes 1b to 6b connected to intake ports 1a to 6a of the cylinders are extended toward the center of a central space 7 formed by the V-shape of the banks. In the upper central part of the central space 7 between the two banks are parallelly disposed two right and left intake connection cavities 8 and 9, adjacent to each other and extending in the longitudinal direction of the engine. To the lower side face 8a of the right intake connection cavity 8 are connected the intake branch pipes 1b, 3b and 5b of cylinders on the right bank R, and to the lower side face 9a of the left intake connection cavity 9 are connected the intake branch pipes 2b, 4b and 6b of cylinders on the left bank L.

The two intake connection cavities 8 and 9 can be connected to each other through a united communicating pipe 10 having first and second communicating pipe sections 11 and 12 at one end Ar in the axial direction of intake connection cavities 8 and 9, such axial direction being indicated by an arrow A. On the upper side face of intake connection cavities 8 and 9 are connected upstream intake pipes 13 and 14, respectively. These upstream intake pipes 13 and 14 are joined at a junction 15 at their upstream ends. From this junction 15 an intake pipe 16 is extended in the upstream direction and is communicated to the atmosphere. A throttle body 100 having a throttle valve 103 is installed in the intake pipe 16 upstream of the junction 15.

Next, the construction of a connection between the intake connection cavities 8 and 9 and the first and second communicating pipe sections 11 and 12 of the communicating pipe 10 will be explained. First, at one end Ar the two intake connection cavities 8 and 9 have slightly smaller diameter communicating pipe sections 8c and 9c, respectively, that extend in the direction of the axis A, contiguous to each other, from the end faces of the intake connection cavities 8 and 9, with round openings 8d and 9d being formed in a plane B intersecting the axis A at right angles. That is, these communicating pipe sections 8c and 9c are formed so that lower surfaces thereof are flush with those of the intake connection cavities 8 and 9 and that upper surfaces thereof are lower than those of the intake connection cavities 8 and 9. On the upper sides of communicating pipe sections 8c and 9c are formed communicating pipe sections 8e and 9e of much smaller diameter disposed contiguous to each other. Round openings 8f and 9f formed in ends of sections 8e and 9e are positioned on the plane B. Bases of the communicating pipe sections 8e and 9e extend along upper sides 8b and 9b of the intake connection cavities 8 and 9 and communicate with openings 8g and 9g formed therein.

In the meantime, the first communicating pipe section 11 is a pipe of the same inside diameter as the openings 8d and 9d positioned in the plane B and is in a U-shape. The second communicating pipe section 12 is of the same inside diameter as the other openings 8f and 9f and is in a U-shape. Pipe sections 11 and 12 are integrally formed so that the second communicating pipe section 12 of small diameter is positioned on the upper side of the first communicating pipe section 11. Ends 11a and 11b of the first communicating pipe section 11 are connected to the openings 8d and 9d of the intake connection cavities 8 and 9, respectively, and ends 12a and 12b of the second communicating pipe section 12 are connected to the openings 8f and 9f of the intake connection cavities 8 and 9, respectively. In the first and second communicating pipe sections 11 and 12 are arranged shutter valves 21a, 21b and 22a, 22b for opening and closing the respective communicating passages, at positions slightly recessed in the axial direction from the openings in the ends thereof. To shutter valves 21a, 21b and 22a, 22b are connected diaphragm devices 101 and 102, respectively, to open and close the shutter valves. Shutter valves 21a, 21b and 22a, 22b are operated by operating pressure introduced to diaphragm devices 101 and 102 in accordance with the valve opening and closing timing of the shutter valves.

Figure 4:
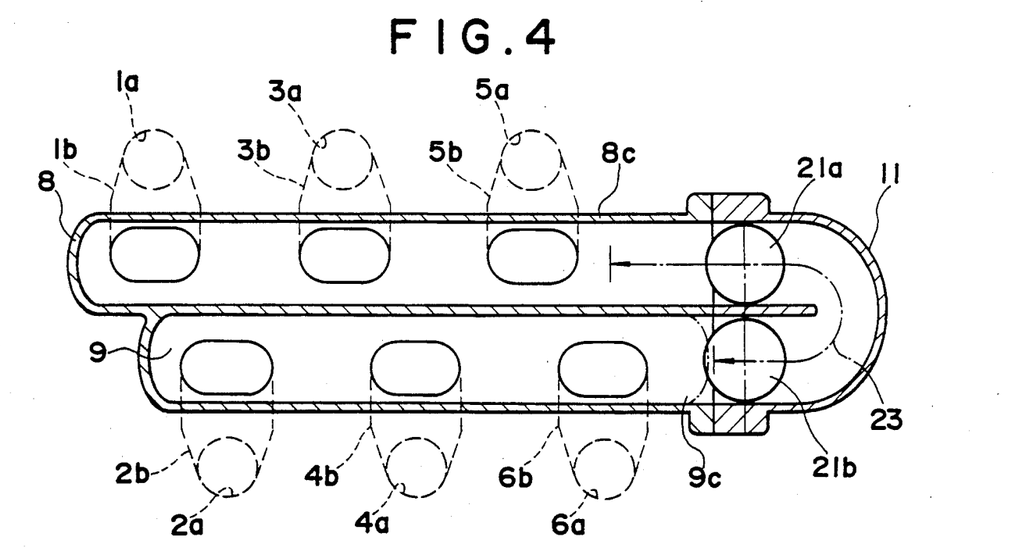
FIG. 4 is an explanatory view showing an open state of a first communicating passage in such embodiment.
Figure 5:
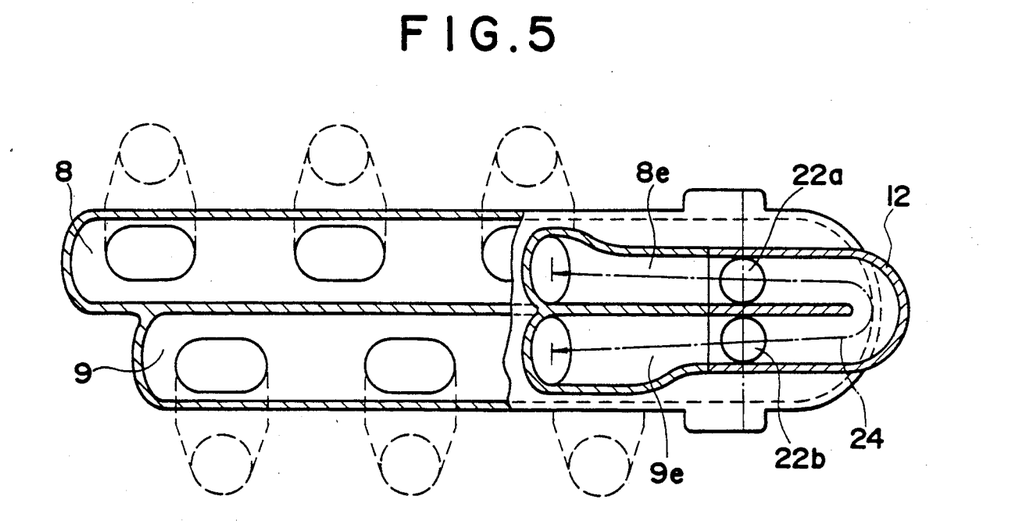
FIG. 5 is an explanatory view showing an open state of a second communicating passage in the example of FIG. 1.

In the intake passage system of the above-described constitution, a first communicating passage 23 (FIG. 4) is formed of the communicating pipe sections 8c and 9c of the intake connection cavities 8 and 9 and the first communicating pipe section 11. Similarly, a second communicating passage 24 (FIG. 5) is formed of the communicating pipe sections 8e and 9e of the intake connection cavities and the second communicating pipe section 12. Therefore, both the intake connection cavities 8 and 9 are interconnected by the first communicating passage 23, as shown in FIG. 4, by opening the shutter valves 21a and 21b of the first communicating pipe section 11. Also, both the intake connection cavities 8 and 9 are interconnected by the second communicating passage 24, as shown in FIG. 5, by opening the shutter valves 22a and 22b of the second communicating pipe section 12. The effective passage length of the first communicating passage is set to be shorter than that of the second communicating passage.

In the intake passage of the above-described construction, the shape and dimensions of each intake passage section, particularly the length and section of the first and second communicating pipe sections 11 and 12, are designed to enable efficient supercharging within a wide range of engine speeds from low to high. That is, in this example, the length of each independent intake passage including the intake ports 1a to 6a and the intake branch pipes 1b to 6b are set to too short a length to perform inertia supercharging within a range of practical engine speeds, to set an inertia tuned engine speed over a red zone, or over a speed N5 shown in FIG. 6 which will be described below. In consequence, it becomes possible to obtain a resonance supercharging effect by the communicating passages even when the engine is running in a high-speed range as described below.

Figure 6:
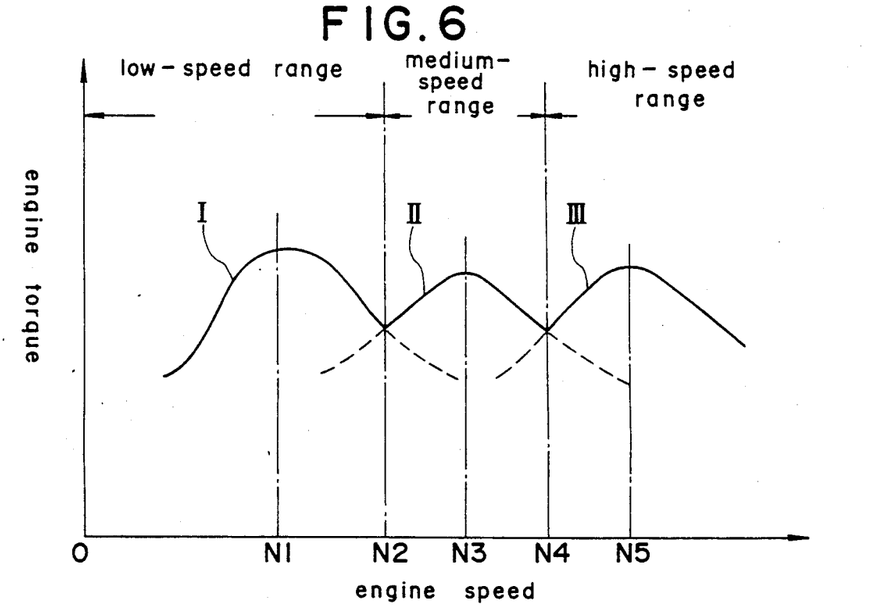
FIG. 6 is a characteristic curve showing engine torque characteristics obtained in the example of FIG. 1.

As shown in FIG. 6, all of the shutter valves 21a, 21b and 22a, 22b are held closed while the engine is operating within a low-speed range under the speed N2. Consequently, the intake air pressure returning section becomes junction 15 of the intake pipes 13 and 14 upstream of both the intake connection cavities, forming a relatively long resonance tube, in which the engine speed at the resonance point becomes N1. Thus, the torque characteristics indicated by the curve I in FIG. 6 can be obtained.

Subsequently, when the engine is running in a medium-speed operation range between N2 and N4, only the shutter valves 22a and 22b that have kept the second communicating passage 12 in a closed position are opened. As a result, the two intake connection cavities 8 and 9 are connected by the second, relatively thin and long communicating passage 12. Therefore, there is formed a resonance pipe consisting of the two intake connection cavities 8 and 9 and the second communicating passage 12. This resonance pipe has a higher resonance point N3 than that during low-speed operation, thus obtaining the torque characteristics indicated by the curve II in FIG. 6.

Next, when the engine speed increases to a high-speed operation range over N4, the shutter valves 21a and 21b that have kept the first communicating passage 11 closed are opened, thereby connecting the two intake connection cavities 8 and 9 to each other through the first and second communicating passages 11 and 12. However, since the first communicating passage 11 is shorter and larger in diameter than the second communicating passage 12, there is formed a resonance pipe consisting of the two intake connection cavities 8 and 9 and the first communicating passage 11. This resonance pipe has a much higher resonance point N5 than the resonance pipe comprising the intake connection cavities 8 and 9 and the second communicating passage 12 during medium-speed operation, and accordingly there can be obtained the torque characteristics indicated by the curve III in FIG. 6. Thus, it is possible to effect efficient supercharging throughout the engine speed range from low to high by opening and closing the communicating passages 11 and 12.

In the air intake device of the aforesaid construction of this embodiment, the two communicating passages for communicating the intake connection cavities are formed at one end, in the axial direction, of the intake connection cavities, with the first communicating passage which is short being connected to the ends of the intake connection cavities and with the second communicating passage which is long being arranged on and connected at the upper sides thereof. Accordingly, the overall pipe length of the second communicating passage 24 whose pipe length is required to be increased, can be increased by moving the position of connection to the intake connection cavities, without increasing the projecting length (the length S shown in FIG. 2) from the end of the intake connection cavities. It is, therefore, possible to install the intake system of the invention, having such communicating passages, within an engine compartment where particularly the available mounting space in the longitudinal is restricted.

Furthermore, in this embodiment, there is adopted the construction that the integrated communicating pipe 10 having the first and second communicating passage sections can be connected to the ends of the intake connection cavities 8 and 9, and that a valve mechanism for opening and closing the communicating passages is arranged on the communicating pipe 10. In this example, therefore, since these two communicating passages can be formed by such a simple operation as the connection of the integrated communicating pipe 10 to the ends of the intake connection cavities 8 and 9, the mounting of this air intake device can be achieved most efficiently.

Figure 7:
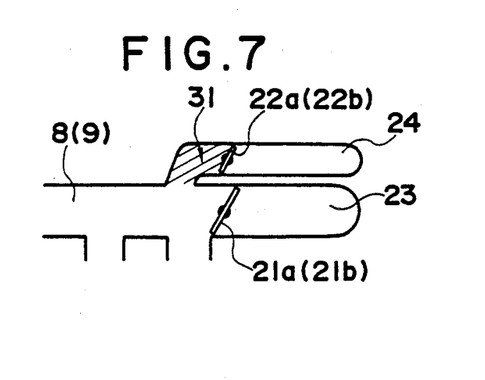
FIGS. 7 and 8 are explanatory views showing large and small dead spaces of the communicating passage in the example of FIG. 1.
Figure 8:
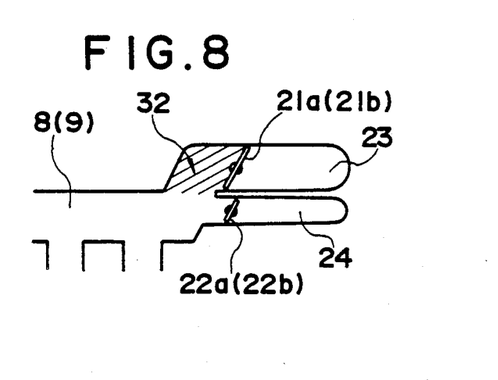

Furthermore, in this embodiment, the small-diameter communicating passage 24 is formed on the upper side, as opposed to an arrangement with the large-diameter communicating passage 23 formed on the upper side. Therefore, the small-diameter communicating passage 24 has only a small amount of dead space when the valves 21a, 21b, 22a and 22b in both the communicating passages are in a closed state. That is, as shown in FIGS. 7 and 8, the amount of dead space in this embodiment is small as is clear from a comparison between the dead space sections 31 and 32 indicated by oblique lines. According to measurement date obtained by the use of actual engines, it is possible to improve supercharging efficiency obtainable within the low engine speed range by decreasing the dead space, and accordingly it has been acknowledged that the torque characteristics I shown in FIG. 6 can be moved upward.

Furthermore, in this embodiment, the independent intake passage section of each cylinder extending from the intake port of each cylinder to the respective intake connection cavity through the intake branch pipe has been set short so that no inertia supercharging will be caused to occur by this section within the practical speed range. The length of the intake branch pipe from each intake port to the respective intake connection cavity 8 or 9 has been set short, and accordingly the intake connection cavities can be situated in the space between the right and left cylinder banks. Engine height, therefore, can be reduced to enable the layout of a compact intake system.

In this embodiment, the second communicating passage 24 is connected to the upper face of both the intake connection cavities 8 and 9, but may be connected to the right and left sides or to the lower surface so long as the first communicating passage 23 is disposed at the same level as the intake connection cavities 8 and 9. Also, the shutter valves that are mounted in the integrated communicating pipe 10 may be mounted in the intake connection cavities 8 and 9.

Figure 9:
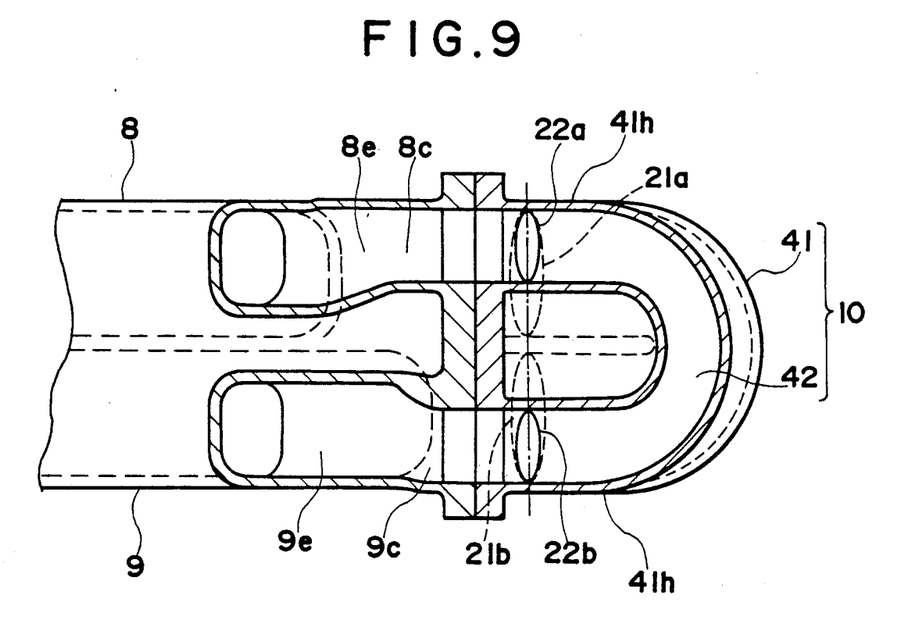
FIG. 9 is a partial sectional view showing a major portion in another embodiment of the present invention.

FIG. 9 shows the construction of a section of the air intake device according to a second embodiment of the present invention. The intake connection cavities 8 and 9 shown in this embodiment are identical except for the construction of the communicating pipes connected to the axial ends thereof. Therefore, explanation will be made below only of an integrated communicating pipe 10 having first and second communicating pipe sections 41 and 42 of this embodiment.

As shown in FIG. 9, the communicating pipe 10 of this embodiment has the first communicating pipe section 41 of a large diameter on the lower side of the second communicating pipe section 42 of a small diameter on the upper side thereof. The first communicating pipe section 41 is in a U-shape, while the second communicating pipe section 42 also is in a U-shape, but with a wider spacing of the legs thereof. The second communicating pipe section 42 has a contour or size in the direction of width thereof that is the same size as the intake connection cavities 8 and 9. The end sections of section 42 connected to the intake connection cavities 8 and 9 are disposed along the outside contour 41h of the first communicating pipe section 41, but the center section is curved with a larger curvature than the outside contour 41h of the first communicating pipe section 41.

With the widening of the first and second communicating pipe sections 41 and 42, the intake pipe sections 8c, 9c and 8e, 9e formed in the intake connection cavities 8, 9 and communicating therewith are also formed along the outer contour, in the direction of width, of the intake connection cavities so as to correspond thereto.

In this embodiment, the second communicating pipe section 42 is widened to a maximum limit such that a part connecting the second communicating pipe section 42 will fit the width of the first communicating pipe section 41 of large diameter, consequently enabling increasing the curvature of the small-diameter communicating section 42 and also increasing the pipe length without increasing the size in the direction of width intersecting the axis of the intake connection cavities. Also, providing a large curvature of the second communicating pipe section 42 as described above can improve supercharging efficiency in the medium engine speed range in which second communicating pipe section 42 is used and consequently can improve torque characteristics (see the curve II in FIG. 6) in the medium-speed range In the present invention, as explained above, the first and second communicating passages for connecting the two intake connection cavities are arranged at one end, in the axial direction, of the intake connection cavities, and are designed such that the first communicating passage of large diameter is connected to the ends of the intake connection cavities, and the second communicating passage of smaller diameter and greater length is connected to the sides of the intake connection cavities. Therefore, the amount of projection in the axial direction of the second communicating passage can be decreased by moving in the axial direction the position of connection thereof to the sides of the intake connection cavities. It is, therefore, possible to install an air intake device having such communicating passages particularly in a space restricted in the lengthwise direction.

Furthermore, in the present invention, the second small-diameter communicating passage may be arranged inside of the outside border or contour of the first large-diameter communicating passage. As a result, the curvature of the small-diameter communicating passage can be increased. Also, the pipe length thereof can be increased without increasing the size in the direction of the width intersecting the axis of the intake collection cavity.

While only certain embodiments of the present invention have been described, it will be apparent to those skilled in the art that various changes and modifications may be made thereto without departing from the spirit and scope of the present invention as claimed.

I claim:

1. An air intake device for an engine having intake pipes connected to respective cylinders divided into first and second groups to prevent the continuance of intake strokes of adjacent cylinders, a first means for connecting intake pipes of the first group of cylinders, and a second means for connecting intake pipes of the second group of cylinders, said first and second connecting means being arranged parallel to each other, for effecting supercharging by utilizing the dynamic effect of intake air into each cylinder, said air intake device comprising:

an upstream intake system arranged at an upstream side of said first and second connecting means, said upstream intake system including upstream intake branch pipes joined at upstream ends thereof to each other at a junction and connected at downstream ends thereof to upper sides of said first and second connecting means, and an upstream intake main pipe connected at a downstream end thereof to said junction of said upstream intake branch pipes and at an upstream end thereof to the atmosphere, with a throttle valve being installed therein;

a first communicating passage connected at one end thereof to a longitudinal end of said first connecting means and at another end thereof to a longitudinal end of said second connecting means at the same end thereof;

a second communicating passage arranged at the same end as said first communicating passage relative to said first and second connecting means, said second communicating passage being connected at one end thereof to a side of said first connecting means and at another end thereof to a side of said second connecting means;

said first communicating passage having an effective length shorter than that of said second communicating passage; and first and second opening and closing means positioned for opening and closing independently communication between said first and second connecting means and said first and second communicating passages.

2. An air intake device of an engine as claimed in claim 1, wherein the engine is a V-6 engine with the cylinders thereof arranged in right and left banks of three cylinders each, the banks being arranged in a V.

3. An air intake device of an engine as claimed in claim 2, wherein said first and second connecting means are situated in a central space formed by the V of said banks, and each of the intake pipes is extended to the central space and connected to the respective of said first and second connecting means.

4. An air intake device of an engine as claimed in claim 1, wherein each of the intake pipes is connected to a lower side face of the respective of said first and second connecting means.

5. An air intake device of an engine as claimed in claim 1, wherein said first and second connecting means are formed as one body.

6. An air intake device of an engine as claimed in claim 1, wherein said first and second connecting means are connected to independent downstream intake systems disposed for each of the cylinders downstream of said first and second connecting means, said independent downstream intake systems being composed of said intake pipes and intake ports connecting each of said intake pipes to respective of said cylinders, and the length of said independent downstream intake systems being set sufficiently short to prevent inertia supercharging within a practical range of engine speed.

7. An air intake device of an engine as claimed in claim 1, wherein said first and second communicating passages are formed in first and second communicating pipes which are connected to said first and second connecting means to enable communication therebetween, said first and second communicating pipes being formed as one body.

8. An air intake device of an engine as claimed in claim 7, wherein said first and second communicating pipes have therein said first and second opening and closing means for opening and closing said first and second communicating pipes, respectively.

9. An air intake device of an engine as claimed in claim 1, wherein said first communicating passage communicating with longitudinal ends of said first and second connecting means includes lower communicating pipe sections disposed adjacent to each other and having lower surfaces flush with lower surfaces of said first and second connecting means and upper surfaces formed lower than upper surfaces of said first and second connecting means intake pipes, said lower communicating pipe sections being of smaller diameter than said first and second connecting means, and opposite ends of said first communicating passage are connected to said first and second connecting means through said lower communicating pipe sections.

10. An air intake device of an engine as claimed in claim 9, wherein said second communicating passage communicating with sides of said first and second connecting means includes upper communicating pipe sections, said upper communicating pipe sections are arranged adjacent to each other and on top of said lower communicating pipe sections extending to upper surfaces of said first and second connecting means, said upper communicating pipe sections being of smaller diameter than said lower communicating pipe sections, and opposite ends of said second communicating passage are connected to upper surface sections of said first and second connecting means through said upper communicating pipe sections.

11. An air intake device of an engine as claimed in claim 10, wherein said lower communicating pipe sections and said upper communicating pipe sections are formed as one body.

12. An air intake device of an engine as claimed in claim 10, wherein said lower communicating pipe sections and said upper communicating pipe sections are formed integrally with said first and second connecting means, respectively.

13. An air intake device of an engine as claimed in claim 10, wherein said first and second communicating passages are formed to the same inside diameter as said lower and upper communicating pipe sections, respectively.

14. An air intake device of engine as claimed in claim 1, wherein each of said first and second communicating passages is formed in a U-shaped path.

15. An air intake device of an engine as claimed in claim 1, wherein said first and second opening and closing means are located in said first and second communicating passages, respectively.

16. An air intake device of an engine as claimed in claim 15, wherein said first and second opening and closing means are provided at opposite ends of said first and second communicating passages, respectively.

17. An air intake device of an engine as claimed in claim 15, wherein, at a low speed range of engine operation, both said first and second opening and closing means maintain said first and second communicating passages closed.

18. An air intake device of an engine as claimed in claim 15, wherein, at a medium-speed range of engine operation, said second opening and closing means opens said second communicating passage, while said first opening and closing means maintains said first communicating passage closed.

19. An air intake device of an engine as claimed in claim 15, wherein, at a high-speed range of engine operation, both said first and second opening and closing means maintain both said first and second communicating passages open.

20. An air intake device of an engine as claimed in claim 1, wherein said second communicating passage communicating with sides of said first and second connecting means has lateral side communicating pipe sections extending to lateral side sections of said first and second connecting means, and opposite ends of said second communicating passage are connected to said lateral side sections of said first and second connecting intake pipes through said lateral side communicating pipe sections.

21. An air intake device of an engine as claimed in claim 1, wherein said second communicating passage communicating with sides of said first and second connecting means has lower communicating pipe sections extending to lower surface sections of said first and second connecting means, and opposite ends of said second communicating passage are connected to said lower surface sections of said first and connecting means through said lower communicating pipe sections.

22. An air intake device of a V-6 engine with the cylinders arranged in right and left banks of three cylinders each, such banks being arranged in a V, having intake pipes connected to respective of said cylinders to prevent the continuance of intake strokes of adjacent cylinders, a first means for connecting intake pipes of the first group of cylinders and a second means for connecting intake pipes of the second group of cylinders, said first and second connecting means being arranged parallel to each other, for supercharging by utilizing the dynamic effect of intake air into each cylinder, said air intake device comprising:

said first and second connecting means being formed as a single integral body and situated in a central space formed by the V of the banks;

said intake pipes being extended to the central space for connection to lower surface sections of respective said first and second connecting means;

a first communicating passage having a U-shaped path, which has lower communicating pipe sections formed integral with said first and second connecting means and arranged adjacent to each other, said lower communicating pipe sections having lower surfaces flush with lower surfaces of said first and second connecting means and having upper surfaces lower than upper surfaces of said first and second connecting means, said first communicating passage being smaller in diameter than said first and second connecting means and being connected at one end thereof to a longitudinal end of said first connecting means and at another end thereof to a longitudinal end of said second connecting means on the same end thereof through said lower communicating pipe sections;

a second communicating passage having a U-shaped path which is formed integral with said first communicating passage, is arranged on the same end of said first and second connecting means as said first communicating passage, and has upper communicating sections that are arranged adjacent to each other on top of said lower communicating pipe sections and are formed integral with said lower communicating pipe sections and said first and second connecting means, said upper communicating pipe sections extending to upper surface sections of said first and second connecting means, being smaller in diameter than said lower communicating pipe sections, and being connected at one end thereof to said upper surface sections of said first connecting means and at another end thereof to said upper surface section of said second connecting means through said upper communicating pipe sections, the effective passage length of said first communicating passage being shorter than that of said second communicating passage; and first and second opening and closing means, provided in said first and second communicating passages, for opening and closing said first and second communicating passages, respectively, and thereby communicating between said first and second connecting means.

23. An air intake device of an engine having intake pipes connected to cylinders divided into first and second groups of cylinders to prevent the continuance of intake stroke of adjacent cylinders, a first means for connecting intake pipes of the first group of cylinders, and a second means for connecting intake pipes of the second group of cylinders, said first and second connecting means being arranged parallel to each other, for supercharging by utilizing the dynamic effect of intake air into each cylinder, said air intake device comprising:

first and second communicating passages for communication between said first and second connecting means, said first and second communicating passages being generally U-shaped and disposed at and connected to one longitudinal end portion of said first and second connecting means, the effective passage length of said first communicating passage being shorter than that of said second communicating passage, the effective sectional area of said first communicating passage being larger than that of said second communicating passage, and said second communicating passage being arranged to be positioned inside of the outside contour of said first communicating passage.

24. An air intake device of an engine as claimed in claim 23, wherein the engine is a V-6 engine with the cylinders arranged in right and left banks of three cylinders each, such banks being arranged in a V.

25. An air intake device of an engine as claimed in claim 24, wherein said first and second connecting means are situated in a central space formed by the V of the banks, with each of the intake pipes being extended to the central space and connected to respective of said first and second connecting means.

26. An air intake device of an engine as claimed in claim 23, wherein the intake pipes are connected to the lower side faces of respective of said first and second connecting means.

27. An air intake device of an engine as claimed in claim 23, further comprising an upstream intake system disposed at an upstream side of said first and second connecting means, said upstream intake system including upstream intake branch pipes which are connected at downstream ends thereof to upper sides of said first and second connecting means and are joined at upstream ends thereof to each other at a junction, and an upstream intake main pipe which is connected at a downstream end thereof to said junction of said upstream intake branch pipes and at an upstream end thereof to the atmosphere, with a throttle valve mounted therein.

28. An air intake device of an engine as claimed in claim 23, wherein said first and second connecting means are formed as one body.

29. An air intake device of an engine as claimed in claim 23, wherein said first and second connecting means are connected to independent downstream intake systems disposed for each of the cylinders on the downstream side thereof, said independent downstream intake systems comprising the intake pipes and intake ports connecting each of the intake pipes to respective of the cylinders, and the length of said independent downstream intake systems being sufficiently short such that, in a practical range of engine speed, inertia supercharging will not be effected.

30. An air intake device of an engine as claimed in claim 23, further comprising first and second opening and closing means positioned for opening and closing independently communication between said first and second connecting means and said first and second communicating passages.

31. An air intake device of an engine as claimed in claim 23, wherein said first communicating passage is disposed under said second communicating passage.

32. An air intake device of an engine as claimed in claim 23, wherein said first and second communicating passages are formed within first and second communicating pipes which are connected to said first and second connecting means to enable interconnection therebetween, said first communicating pipe being U-shaped with two turned ends thereof in contact each other, and said second communicating pipe being U-shaped with two turned ends thereof spaced from each other in the direction of the width of said first and second connecting means.

33. An air intake device of an engine as claimed in claim 32, wherein the width of each of said first and second communicating pipes is equal to the width of both of said first and second connecting means, with said turned ends of said second communicating pipe conforming to the outside contour of said first communicating pipe, and with a central curved section of said second communicating pipe being curved at a larger curvature than a central curved section of said first communicating pipe within said outside contour of said first communicating pipe.

34. An air intake device of an engine as claimed in claim 33, wherein both turned ends of each of said first and second communicating pipes are connected to one longitudinal end side of said first and second connecting means at lateral end edges thereof.

35. An air intake device of an engine as claimed in claim 32, wherein said first and second communicating pipes are formed as one body.

36. An air intake device of an engine as claimed in claim 35, wherein said first and second communicating pipes have therein respective first and second opening and closing means for opening and closing said first and second communicating pipes, respectively.

37. An air intake device of an engine as claimed in claim 23, wherein said first and second communicating passages have therein first and second opening and closing means for opening and closing communication between said first and second communicating passages, respectively, and said first and second connecting means.

38. An air intake device of an engine as claimed in claim 37, wherein said first and second opening and closing means are provided at both ends of respective said first and second communicating passages.

39. An air intake device of an engine as claimed in claim 37, wherein, at a low-speed range of engine operation, both said first and second opening and closing means maintain said first and second communicating passages closed.

40. An air intake device of an engine as claimed in claim 37, wherein, at a medium-speed range of engine operation, said second opening and closing means maintains said second communicating passage open and said first opening and closing means maintains said first communicating passage closed.

41. An air intake device of an engine as claimed in claim 37, wherein at a high-speed range of engine operation, both said first and second opening and closing means maintain said first and second communicating passages open.

42. An air intake device of an engine having intake pipes connected to respective cylinders divided into first and second groups to prevent continuance of intake strokes of adjacent cylinders, a first means for connecting intake pipes which are of the first group of cylinders, and a second means for connecting intake pipes which are of the second group of cylinders, for effecting supercharging by utilizing the dynamic effect of intake air into each cylinder, said air intake device comprising:

an upstream intake system connected to upstream end of said first and second connecting means for introducing intake air from the atmosphere into each of said first and second connecting means;

a pair of first and second communicating passages disposed at one end of said first and second connecting means and connecting said first and second connecting means to each other and an effective passage length of said first communicating passage being shorter than that of said second communicating passage.

43. An air intake device of an engine having intake pipes connected to respective cylinders divided into first and second groups to prevent continuance of intake strokes of adjacent cylinders, a first means for connecting intake pipes which are of the first group of cylinders, and a second means connecting intake pipes which are of the second group of cylinders, for effecting supercharging by utilizing the dynamic effect of intake air into each cylinder, said air intake device comprising:

first and second pairs of openings formed in said first and second connecting means, respectively;

a pair of first and second communicating passages disposed at one end of said first and second connecting means connected to said first and second pairs of openings, respectively, to connect said first and second connecting means;

first and second opening and closing means provided at said first and second pairs of openings of said first and second connecting means, respectively, to open and close the same independently and to connect said first and second connecting means to said first and second communicating passages; and an effective passage length of said first communicating passage being shorter than that of said second communicating passage.

44. An air intake device of an engine having intake pipes connected to respective cylinders divided into first and second groups to prevent continuance of intake strokes of adjacent cylinders, a first means for connecting intake pipes which are of the first group of cylinders, and a second means for connecting intake pipes which are of the second group of cylinders, for effecting supercharging by utilizing the dynamic effect of intake air into each cylinder, said air intake device comprising:

a pair of first and second communicating passages, capable of opening and closing independently and separately, disposed at one end of said first and second connecting means and connecting said first and second connecting means with each other; and an effective passage length of said first communicating passage being shorter than that of said second communicating passage.

* * * * *